US 9,629,071 B2

(12) United States Patent
Tian et al.

(10) Patent No.: US 9,629,071 B2
(45) Date of Patent: Apr. 18, 2017

(54) ACCESS POINT COORDINATED RE-ASSOCIATION OF WIRELESS DEVICES

(71) Applicant: QUALCOMM Incorporated, San Diego, CA (US)

(72) Inventors: Qingjiang Tian, San Diego, CA (US); Yanjun Sun, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 14/035,991

(22) Filed: Sep. 25, 2013

(65) Prior Publication Data

US 2015/0085844 A1 Mar. 26, 2015

(51) Int. Cl.
*H04W 4/00* (2009.01)
*H04W 48/16* (2009.01)
*H04W 60/00* (2009.01)
*H04W 36/00* (2009.01)
*H04W 36/08* (2009.01)

(52) U.S. Cl.
CPC ....... *H04W 48/16* (2013.01); *H04W 36/0033* (2013.01); *H04W 36/08* (2013.01); *H04W 60/00* (2013.01)

(58) Field of Classification Search
CPC . H04W 36/0072; H04W 36/08; H04W 88/08; H04W 92/20; H04L 5/0035; H04L 5/0073
See application file for complete search history.

(56) References Cited

U.S. PATENT DOCUMENTS 7,907,562 B2 3/2011 Murty et al.
8,346,275 B2 1/2013 Ogura
(Continued)

FOREIGN PATENT DOCUMENTS

WO 2006031588 3/2006
WO 2015047884 4/2015

OTHER PUBLICATIONS

"PCT Application No. PCT/US2014/056437 International Search Report", Jan. 21, 2015, 12 pages.
(Continued)

*Primary Examiner* — Shaq Taha
*Assistant Examiner* — Ryan Kavleski
(74) *Attorney, Agent, or Firm* — DeLizio Law, PLLC

(57) ABSTRACT

A first AP in a wireless network determines that a wireless client device should re-associate from the first AP to a second AP of the wireless network. The first AP communicates an AP coordination message from the first AP to the second AP to share coordination information with the second AP. The first AP coordinates with the second AP to cause the re-association of the wireless client device in accordance with the coordination information. The first and second AP may coordinate directly to synchronize re-association activities. Re-association activities may include the use of a configuration message to the wireless client device, managing transmit power of beacon messages from the first and second APs, or forced disassociation and blocking. The first AP may maintain a record of which re-association activity was successful in causing the wireless client device to re-associate to the second AP.

44 Claims, 10 Drawing Sheets

(56) References Cited

U.S. PATENT DOCUMENTS

| | | |
|---|---|---|
| 2004/0121772 A1* | 6/2004 | Rue .................. H04L 63/08 455/436 |
| 2008/0064404 A1 | 3/2008 | Zhang et al. |
| 2008/0109885 A1* | 5/2008 | Sim ................ H04W 12/06 726/5 |
| 2008/0165735 A1* | 7/2008 | Chen et al. ............... 370/331 |
| 2008/0212542 A1* | 9/2008 | Kung .............. H04W 36/0005 370/336 |
| 2011/0142019 A1 | 6/2011 | Bharghavan et al. |
| 2011/0149913 A1 | 6/2011 | Park et al. |
| 2011/0275361 A1 | 11/2011 | Yavuz et al. |
| 2012/0008596 A1 | 1/2012 | Jung et al. |
| 2012/0155308 A1* | 6/2012 | Lee .................. H04W 24/00 370/252 |
| 2012/0224483 A1 | 9/2012 | Babiarz et al. |
| 2013/0272269 A1* | 10/2013 | Srivastava et al. .......... 370/332 |

OTHER PUBLICATIONS

"PCT Application No. PCT/US2014/056437 Written Opinion of the IPEA", Sep. 4, 2015, 8 pages.
"PCT Application No. PCT/US2014/056437 International Preliminary Report on Patentability", Nov. 25, 2015, 9 pages.

* cited by examiner

ACCESS POINT COORDINATED RE-ASSOCIATION OF WIRELESS DEVICES

BACKGROUND

Embodiments of the present disclosure generally relate to the field of communication networks, and, more particularly, to forced association of wireless client devices with a desired access point of a wireless network.

In a wireless network (e.g., a wireless local area network, or WLAN), a wireless client device (e.g., a wireless station, or STA) may establish a wireless association (i.e., "associate") with a wireless access point (AP). When a wireless network includes two or more APs, the wireless client device may select an AP using an AP selection algorithm at the wireless client device. However, the wireless client device may not be aware of backhaul conditions of the wireless network when choosing an AP. There may be many conditions known to one or more APs which may not be known to the wireless client device during selection of an AP.

Various network conditions may be relevant to selecting an AP to optimize performance characteristics (e.g., throughput, etc.). Hybrid communication networks typically comprise multiple networking technologies (e.g., wireless local area network (WLAN) technologies, powerline communication technologies, Ethernet, etc.) that may be interconnected using bridging-capable devices that forward packets between devices utilizing the different network technologies and media in order to form a single extended communication network. For example, in a hybrid communication network, each hybrid device may support multiple layer 2 interfaces using different access technologies (e.g., Ethernet, Wi-Fi, Coax, and Powerline) which can lead to varying conditions in the backhaul. Powerline communications (PLC) and Wi-Fi networks may be susceptible to noise from the environment, which may alter performance characteristics associated with a communications connection. Even though a wireless client device may initially chose an AP based upon signal strength, another AP may become a better choice as a result of changes to backhaul performance, loading, or user movement. Furthermore, each wireless client device may have different hardware capabilities (e.g., 2.4 GHz and/or 5 GHz support, dual band single radio, dual band dual concurrent radios, etc.). The IEEE 802.11 standards may define a Basic Services Set (BSS) transmission management mechanism to allow an AP to suggest that a wireless client device transition to a different AP. However, the wireless client device may choose to ignore the suggestion, or may not implement the capability.

SUMMARY

Various embodiments are disclosed to implement an access point coordinated re-association of a wireless client device in a wireless network. Prior to the access point coordinated re-association, the wireless client device may be wirelessly associated with a first AP. After the access point coordinated re-association, the wireless client device may be wirelessly associated with a second AP.

In one embodiment, a first AP determines to cause a wireless client device to re-associate to a second AP. An AP coordination message is communicated from the first AP to the second AP. The AP coordination message identifies the wireless client device and includes re-association coordination information. The first AP coordinates with the second AP to cause the re-association of the wireless client device in accordance with the re-association coordination information.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
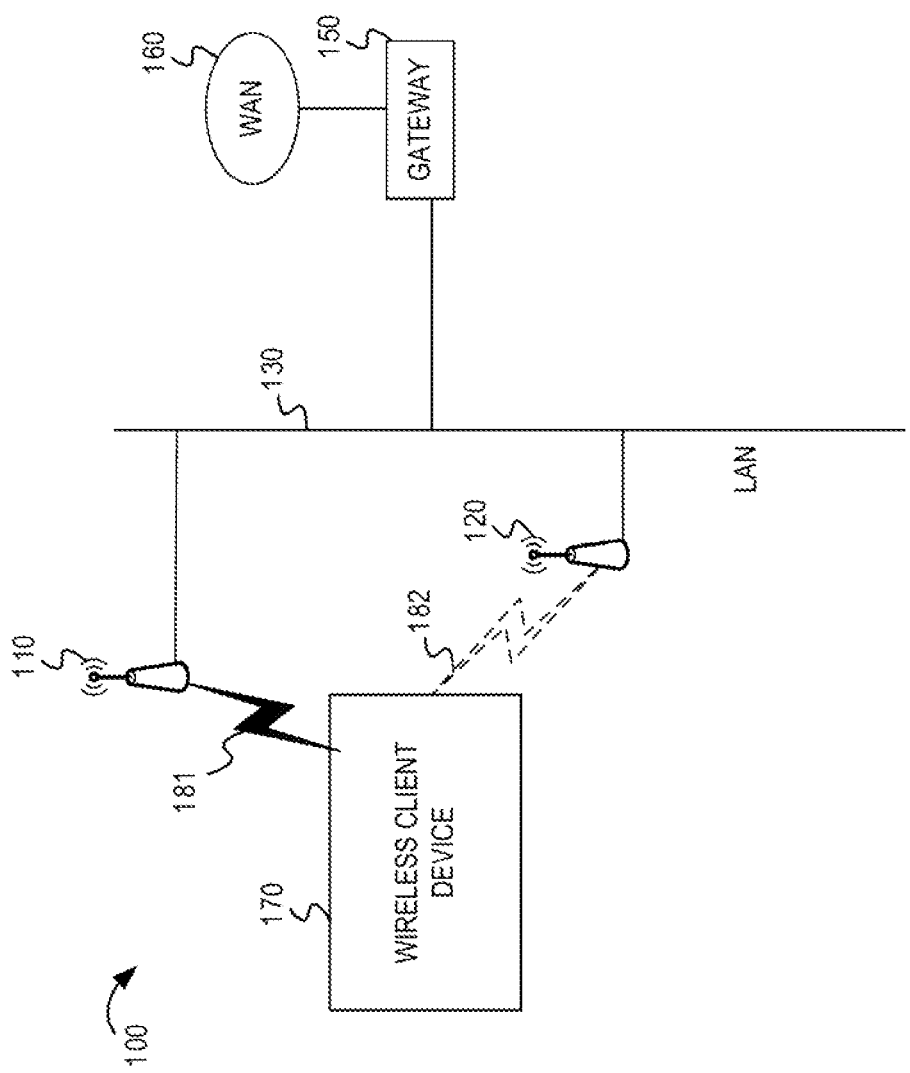
FIG. 1 depicts an example system diagram of a wireless network.

The description that follows includes exemplary systems, methods, techniques, instruction sequences and computer program products that embody techniques of the present disclosure. However, it is understood that the described embodiments may be practiced without these specific details. For instance, although examples refer to re-associating (which may also be referred to as transiting, switching, moving, repositioning, handing over, etc.) a single wireless client device from a first AP to a second AP, embodiments are not so limited. In some embodiments, the first and second APs may coordinate to re-associate a plurality of wireless client devices from the first AP to the second AP or amongst a plurality of APs. In other instances, well-known instruction instances, protocols, structures and techniques have not been shown in detail in order not to obfuscate the description.

A wireless client device may be communicatively coupled (e.g., wirelessly associated or having a wireless association in accordance with an association protocol) with a first AP of a wireless network. The first AP may have access to more information regarding backhaul conditions or other available access points than is available to the wireless client device. For example, the first AP and a second AP may exchange information (either directly or through a central controller) regarding network conditions determined by each of the first and second APs. In accordance with this disclosure, the first AP may determine to re-associate (which may also be referred to as move, transfer, relocate, transition, switch, re-position, handover, or the like) the wireless client device from the first AP to the second AP of the wireless network. The first AP may determine that a re-association should occur based on a variety of factors including, but not limited to, backhaul capacity, wireless resource utilization, peer-to-peer communication, or the like.

In this disclosure, a re-association of the wireless client device refers to a change in the wireless association of the wireless client device from a first AP to a second AP. Prior to a re-association, the wireless client device may be wirelessly associated with the first AP. After the re-association, the wireless client device may be wirelessly associated with the second AP. In some embodiments, re-association may also involve the exchange of association protocol messages between the wireless client device and the second AP. Re-association does not necessarily involve physical or geographic movement of the wireless client device.

There are several ways in which a re-association could be performed in a wireless network. It should be noted that a re-association does not necessarily involve any messages from the first AP to the client device, such as a handover or handoff message to a wireless client device. In many examples described herein, the first and second APs manage the wireless environment such that the wireless client device independently performs a client-side AP selection that effectively results in a re-association of the wireless client device from the first AP to the second AP.

The APs may coordinate re-association activities to cause the wireless client device to re-associate from the first AP to the second AP. The first and second APs may coordinate re-association activities to cause the wireless client device to perform client-side AP selection of the second AP which effectively results in the desired re-association. Furthermore, the first AP and/or the second AP may maintain a history of which re-association activities are supported and/or effective for particular client devices as well as latency associated with previous re-associations. The latency information may indicate an amount of time between beginning of a previous re-association activity and a completion of the previous re-association activity.

FIG. 1 depicts an example system diagram that includes a wireless network 100. The wireless network 100 includes a wireless client device 170 (e.g., a laptop, computer, sensor, camera, thermostat, mobile station, wireless device, a smartphone, etc.), a first AP 110, and a second AP 120. The wireless network 100 may be served by a local area network (LAN) backhaul 130. The LAN backhaul 130 may be communicatively coupled to a wide area network (WAN) 160 via a gateway 150. Initially in FIG. 1, the wireless client device 170 is associated with the first AP 110 via a first wireless link 181. In this document, terms such as wireless link, wireless connection, wireless association, or the like, may be used interchangeably to refer to a wireless communications relationship between two devices.

In some examples, coordination between the first AP and the second AP may assist in the identification of conditions in which the wireless client device would be better served in the wireless network by having the wireless client device re-associate from the first AP to the second AP. The first and second APs 110, 120 may exchange information to determine whether the wireless client device 170 would be better served by the second AP 120. For example, the APs 110, 120 may exchange information about network traffic flow, backhaul network conditions, or network bandwidth availability. The APs 110, 120 may exchange information regarding wireless capacity to serve the wireless client device 170 or the number of wireless client devices associated with the each AP (as described below in FIG. 3). When the backhaul conditions support greater throughput for the wireless client device via the second AP 120 (rather than the first AP 110), a re-association of the wireless client device from the first AP 110 to the second AP 120 may be initiated. Similarly, when the first AP 110 is overloaded (e.g., being associated with a large number of wireless client devices), the first AP 110 and the second AP 120 may coordinate to re-associate the wireless client device to the second AP 120. In some embodiments, the APs 110, 120 may exchange information about application throughput, such as throughput capable from each of the APs 110, 120 to an application server (such as, without limitation, a resource via the WAN 160). For example, the second AP 120 may offer greater application throughput (via the LAN backhaul 130 to the WAN 160) to the wireless client device 170 than the application throughput offered by the first AP 110.

The APs 110, 120 may also exchange information (as described below in FIG. 6) about any existing network traffic between the wireless client device 170 and one or more other wireless client devices associated with the second AP 120. Based on information exchanged with another AP, the first AP 110 may determine that the wireless client device 170 should re-associate to the second AP 120. For example, when a first wireless client device (such as wireless client device 170) is directing traffic primarily to a second wireless client device (not shown) associated with the second AP 120, it may be desirable to cause the first wireless client device to re-associate to the second AP 120. In some implementations, the APs 110, 120 may consolidate a plurality of wireless client devices to re-associate with the same AP then they may engage in direct peer-to-peer communications. By coordinating re-association activities between the first and second APs, the peer wireless client devices can be associated to the same access point. Coordination between the first and second APs may prevent the peer wireless client devices from re-associating from the first AP to the second AP if the peer wireless client devices are already associated with the same first AP. As such, the first AP and second AP may share information to increase the likelihood that devices with peer-to-peer traffic are associated with the same access point.

Upon determining to cause the re-association of wireless client device 170 from the first AP 110 to the second AP 120, the first AP 110 may communicate an AP coordination message (as described below in FIG. 5) to the second AP 120. The AP coordination message may include information about the wireless client device 170 (e.g., an identifier or other information regarding the wireless client device 170) and one or more instructions for coordinating re-association activities at the second AP 120. It is noted that in some implementations, the AP coordination message may be exchanged directly between the wireless access points (such as APs 110, 120) of the wireless network. In other implementations, the APs may coordinate by communicating via a central controller. In other implementations, one of the APs may be designated a master AP or a centralized AP for purposes of coordinating re-association activities among a group of APs.

This disclosure includes several re-association activities which may be used by the APs to cause a re-association of a wireless client device from a first AP to a second AP. Not all re-association activities (also referred to as re-association techniques or procedures) are supported by each wireless client device. For example, in IEEE 802.11v or other protocols, the first AP may simply ask the wireless client device to re-associate to the second AP. An IEEE 802.11v configuration message may include a list of one or more other APs (for example, including the second AP) as a suggestion to the wireless client device to re-associate to another AP. But if the wireless client device does not support IEEE 802.11v protocols or chooses to ignore the suggestion, the re-association may not occur. Another re-association activity may include network-side operations, such as the first AP forcing a hard disconnect of the wireless client device. The first AP may block traffic (at least one incoming packet) for the wireless client device to cause the wireless client device to select another AP. In yet another re-association activity, the first AP may reduce power of a beacon transmission such that the wireless client device may perceive reduced signal strength associated with the first AP and independently select the second AP.

In several of the re-association activities described in this disclosure, the success of the re-association activity may be improved by coordinating re-association activities of the first AP with re-association activities of the second AP. For example, in the example where the first AP reduces power of the beacon transmission, it may be possible for the second AP to concurrently increase power of beacon transmissions from the second AP to further stimulate the wireless client device to select the second AP. In some implementations, the first and second AP may coordinate power levels of beacon frames while forcibly disassociating the wireless client device from the first AP to cause the wireless client device to select the second AP based on signal strength metrics.

Returning to FIG. 1, the first AP 110 and the second AP 120 may coordinate to re-associate the wireless client device 170 from the first AP 110 to the second AP 120. Upon completion of the re-association, the wireless client device 170 may no longer have the first wireless link 181 with the first AP 110, but rather will have a second wireless link 182 between the wireless client device 170 and the second AP 120. The re-association may include the wireless client device 170 performing a network re-selection process (e.g., scan and association) that results in the second wireless link 182 instead of the first wireless link 181. As described previously, there may be several techniques or re-association activities which the first AP 110 and second AP 120 may perform concurrently to cause the wireless client device 170 to select the second AP 120 rather than the first AP 110.

In some embodiments, a record of previous re-association activities for the wireless client device may be maintained at a network memory to identify the previous re-association activities that successfully caused the re-association of the wireless client device 170 from the first AP 110 to the second AP 120. In some implementations, a latency associated with a previous re-association activity may be stored with the history of the previous re-association activity. For example, the first AP 110 may record the latency from initiating a particular re-association technique until receiving confirmation from the second AP 120 that the wireless client device 170 has completed the re-association. The first AP 110 may determine, for example, that a wireless client device 170 supports more than one re-association technique and may select a particular re-association technique which is associated with a lower average latency based on previous uses of the particular re-association technique.

In some implementations, one or both of the first AP 110 and the second AP 120 may store the information about previous re-association operations in their respective memories. In other implementations, the first AP 110 and/or the second AP 120 may store the information about the re-association operations at a central AP of the wireless network 100. The first AP 110 and/or the second AP 120 can utilize information regarding the history of previous re-association operations for the wireless client device 170 to determine a set of operations to be performed in a subsequent re-association of the wireless client device 170 (as described below in FIG. 9).

Figure 2:
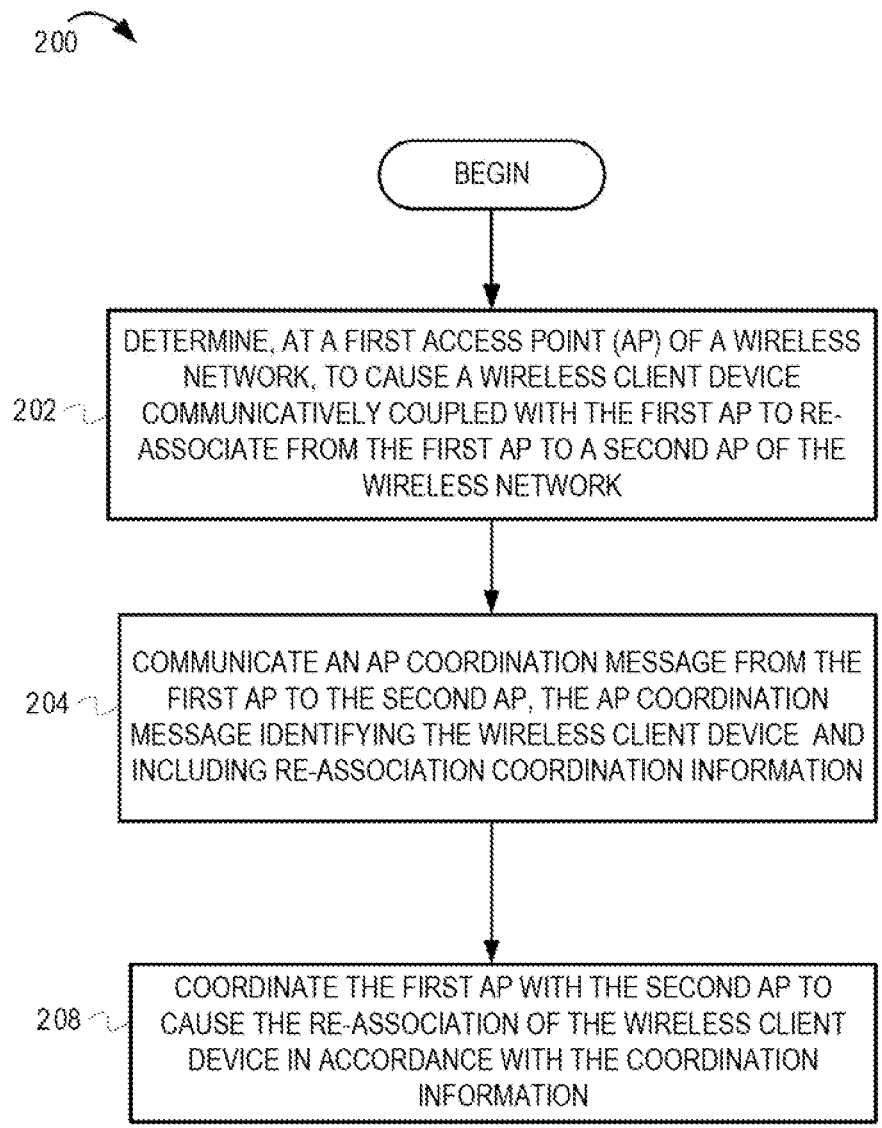
FIG. 2 illustrates a flow diagram of example operations to implement a re-association of a wireless client device from a first AP to a second AP of a wireless network.

FIG. 2 illustrates a flow diagram 200 of example operations resulting in a re-association of a wireless client device from a first AP to a second AP of a wireless network.

At block 202, it is determined, at a first AP of a wireless network, to cause a wireless client device to re-associate from the first AP to a second AP of the wireless network. The first AP may determine to cause the wireless client device to re-associate to the second AP based, at least in part, upon backhaul capacity, wireless resource utilization, peer-to-peer communication, or other conditions.

At block 204, an AP coordination message is communicated from the first AP to the second AP. The AP coordination message identifies the wireless client device and includes coordination information to coordinate the re-association from the first AP to the second AP. In one implementation, the AP coordination information includes a device identifier of the wireless client device. The AP coordination message may also include timing information or other coordination information regarding a selected re-association activity that will be performed by the first AP to cause the wireless client device to re-associate to the second AP.

At block 208, the first AP coordinates with the second AP to cause the re-association of the wireless client device in accordance with the coordination information. For example, the first AP may instruct the second AP to temporarily increase the transmit power of the beacon frames transmitted from the second AP. In some embodiments, the first AP may reduce the transmit power of the beacon frames transmitted from the first AP. The first AP may cause a disassociation of the wireless client device, prompting the wireless client device to rescan for available APs. On detecting beacon frames with greater power (e.g., greater received signal strength indicator (RSSI)) from the second AP, the wireless client device may associate with the second AP, effectively resulting in re-association from the first AP to the second AP. By coordinating re-association activities, the first AP and second AP may cause a legacy wireless client device to select the appropriate AP without specific re-association commands to the legacy wireless client device. Furthermore, timing information may be used to synchronize re-association activities among APs so that transmit power adjustments or other re-association activities can be performed temporarily and concurrently.

Figure 3:
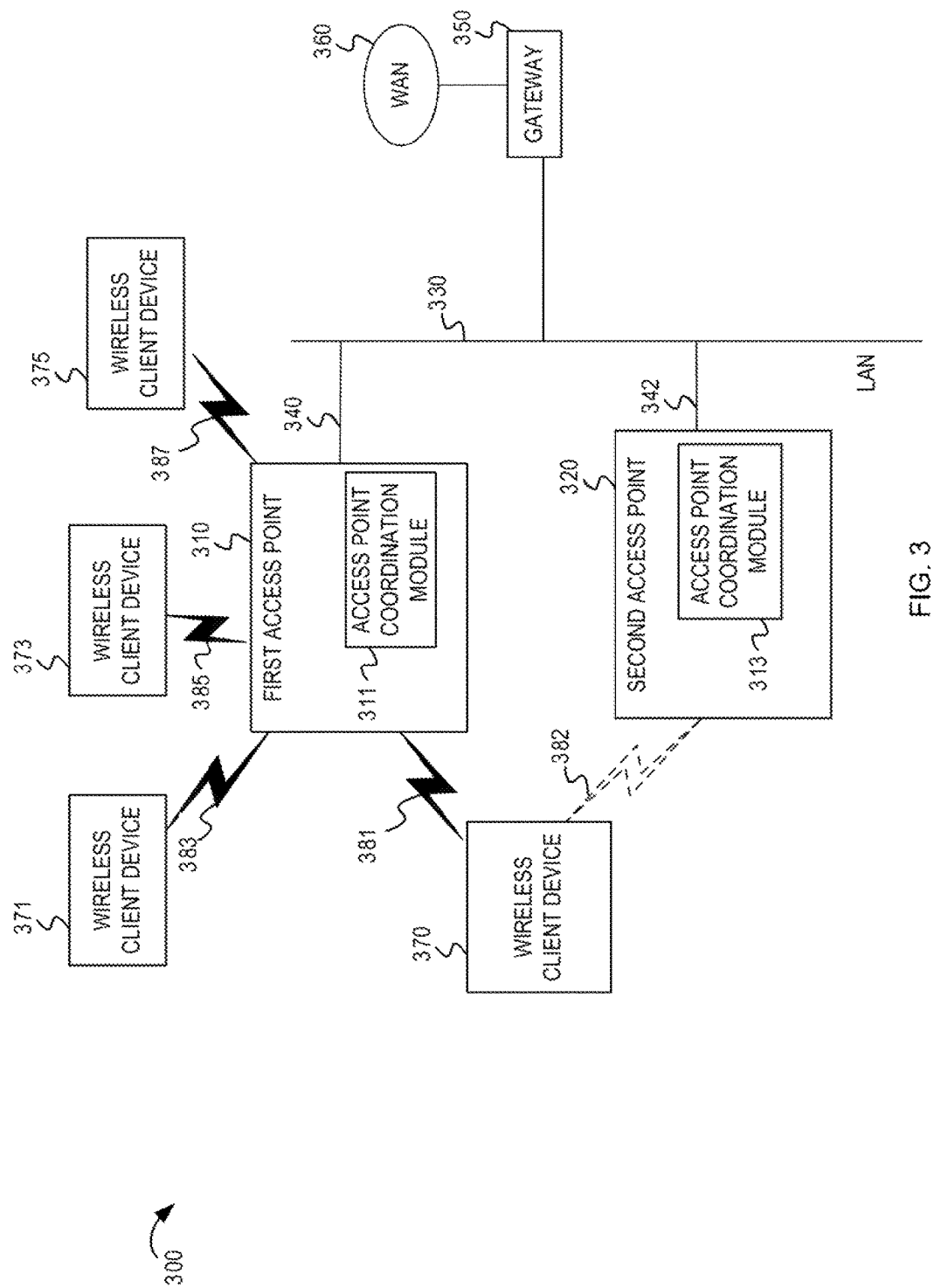
FIG. 3 depicts an example conceptual diagram for detecting network conditions in a wireless network to cause a wireless client device to re-associate from a first AP to a second AP of a wireless network.

FIG. 3 depicts an example conceptual diagram for detecting network conditions in a wireless network to re-associate a wireless client device from a first AP 310 to a second AP 320 of a wireless network 300, similar to the corresponding features of FIG. 1. The wireless network 300 may include a first AP 310 having a first AP coordination module 311, a second AP 320 having a second AP coordination module 313, and wireless client devices 370, 371, 373, 375. The APs 310, 320 may be similar to the APs 110, 120, respectively. Similarly, the wireless client devices 370, 371, 373, 375 may be similar to the wireless client device 170. In FIG. 3, the wireless client devices 370, 371, 373, and 375 are associated with the first AP 310 via wireless links 381, 383, 385, and 387, respectively. FIG. 3 depicts a wireless link 382 between the wireless client device 370 and the second AP 320 that will result after completing the re-association of the wireless client device 370 from the first AP 310 to the second AP 320.

The wireless network 300 may be served by a backhaul LAN 330. The LAN 330 may be interfaced to a WAN 360 via a gateway 350. The APs 310, 320 may be communicatively coupled to the LAN 330 via backhaul links 340 and 342, respectively. The AP coordination modules 311, 313 may coordinate with each other to re-associate the wireless client device 370 from the first AP 310 to the second AP 320. It should be noted that the AP coordination modules 311, 313 may be implemented as software, hardware, or a combination of software and hardware. For example, the AP coordination modules 311, 313 may be implemented as a protocol layer of a protocol stack.

In some implementations, the first AP coordination module 311 may coordinate with the second AP coordination module 313 to determine that the wireless client device 370 should re-associate from the first AP 310 to the second AP 320. For example, the first AP coordination module 311 may determine that the wireless client device 370 may achieve greater throughput or require less wireless medium utilization on a wireless link (i.e., the wireless link 382) with the second AP 320. The first AP coordination module 311 may also determine that an association of the wireless client device 370 with the second AP 320 may result in better load balancing amongst the APs 310, 320 of the wireless network 300. For example, the first AP coordination module 311 may receive information about the number of wireless client devices associated with the second AP 320. The first AP coordination module 311 may determine greater contention by the wireless client devices 370, 371, 373, 375 at the first AP 310 as compared to the lesser contention of fewer devices at the second AP 320. The first AP coordination module 311 may then determine that the association of the wireless client device 370 with the second AP 320 would result in better load balancing amongst the APs 310, 320.

In one implementation, the first AP coordination module 311 may estimate the throughput and medium time utilized by the wireless client device 370 if the wireless client device 370 was associated with the second AP 320. The first AP coordination module 311 may then determine whether an association of the wireless client device 370 with the second AP 320 would provide greater throughput or result in less medium time utilized on the wireless link 382. For example, the first AP coordination module 311 may receive information about channel condition (e.g., channel noise, net throughput at the wireless client device 370, etc.) between the first AP 310 and the wireless client device 370 from the wireless client device 370. The first AP coordination module 311 may also receive information about alternative APs (e.g., the second AP 320) detected by the wireless client device 370, and a received signal strength of beacon frames from the second AP 320. The first AP coordination module 311 may receive information from the wireless client device 370 using beacon reports from the wireless client device 370, an application running on the wireless client device 370, etc.

The first AP coordination module 311 may coordinate with AP coordination modules of one or more APs (e.g., the second AP coordination module 313 of the second AP 320) to determine characteristics of backhaul links of the respective APs. For example, the first AP coordination module 311 may receive information about the available network bandwidth on the backhaul link 342 from the second AP coordination module 313. The first AP coordination module 311 may also receive information about the number of wireless client devices associated with the second AP 320, the throughput to each of the wireless client devices and whether the second AP 320 can associate with the wireless client device 370.

Based on the information received from the wireless client device 370 and information received from the second AP coordination module 313, the first AP coordination module 311 may determine to cause the wireless client device 370 to re-associate from the first AP 310 to the second AP 320. For example, the first AP coordination module 311 may calculate an expected throughput gain that might result from the wireless client device 370 being associated with the second AP 320. In some implementations, when the throughput gain is not significant (e.g., not above a predetermined threshold), the first AP coordination module 311 may determine not to cause the re-association. The first AP coordination module 311 may also determine whether the association of the wireless client device 370 with the second AP 320 would result in lower utilization of network resources (e.g., shorter data paths, less number of hops, etc.) in the wireless network 300. On determining that the association of the wireless client device 370 with the second AP 320 would result in lower utilization of the network resources, the first AP coordination module 311 may determine to re-associate the wireless client device 370 from the first AP 310 to the second AP 320.

In another implementation, the first AP coordination module 311 may detect unbalanced loads amongst the APs 310, 320 in the wireless network 300. The first AP coordination module 311 may detect the unbalanced loads when the channel utilization of the wireless communication medium reaches a level above a predefined threshold. For example, when the wireless client devices 370, 371, 373, and 375 are associated with the first AP 310, the channel utilization of the wireless communication medium by the first AP 310 may become greater than the predefined threshold. The first AP coordination module 311 may receive information about the alternative APs detected by each of the wireless client devices 370, 371, 373, and 375. For example, the first AP coordination module 311 may receive information about the alternative APs detected by the wireless client device 370, and orthogonal channels utilized by the alternative APs for communication over the wireless medium. The first AP coordination module 311 can then determine an AP (e.g., the second AP 320) that utilizes a different wireless channel than the wireless channel utilized by the first AP 310. For example, the different wireless channels may be orthogonal.

The first AP coordination module 311 may receive information from the wireless client device 370 using beacon reports from the wireless client device 370, an application running on the wireless client device 370, etc. The first AP coordination module 311 may coordinate with the second AP coordination module 313 of the second AP 320 to determine characteristics of the backhaul link 342. For example, the first AP coordination module 311 may receive information about the available network bandwidth on the backhaul link 342 from the second AP coordination module 313. The first AP coordination module 311 may also receive information about the number of wireless client devices associated with the second AP 320, the throughput to each of the wireless client devices and whether the second AP 320 can associate with the wireless client device 370.

Based on the information received from the wireless client device 370 and/or information received from the second AP coordination module 313, the first AP coordination module 311 may determine to cause a re-association of the wireless client device 370 from the first AP 310 to the second AP 320. For example, the first AP coordination module 311 may determine that on association of the wireless client device 370 with the second AP 320, the contention at the first AP 310 would decrease while contention at the second AP 320 remains below a predefined threshold. In one example, the first AP coordination module 311 may calculate that the first AP 310 is contended by three wireless client devices (i.e., 371, 373, and 375) after the re-association of the wireless client device 370 to the second AP 320. The first AP coordination module 311 may also calculate a throughput gain for the wireless client devices 371, 373, and 375, on association of the wireless client device 370 with the second AP 320. If the throughput gain is above a predefined threshold, the first AP coordination module 311 may determine to re-associate the wireless client device 370 from the first AP 310 to the second AP 320.

Figure 4:
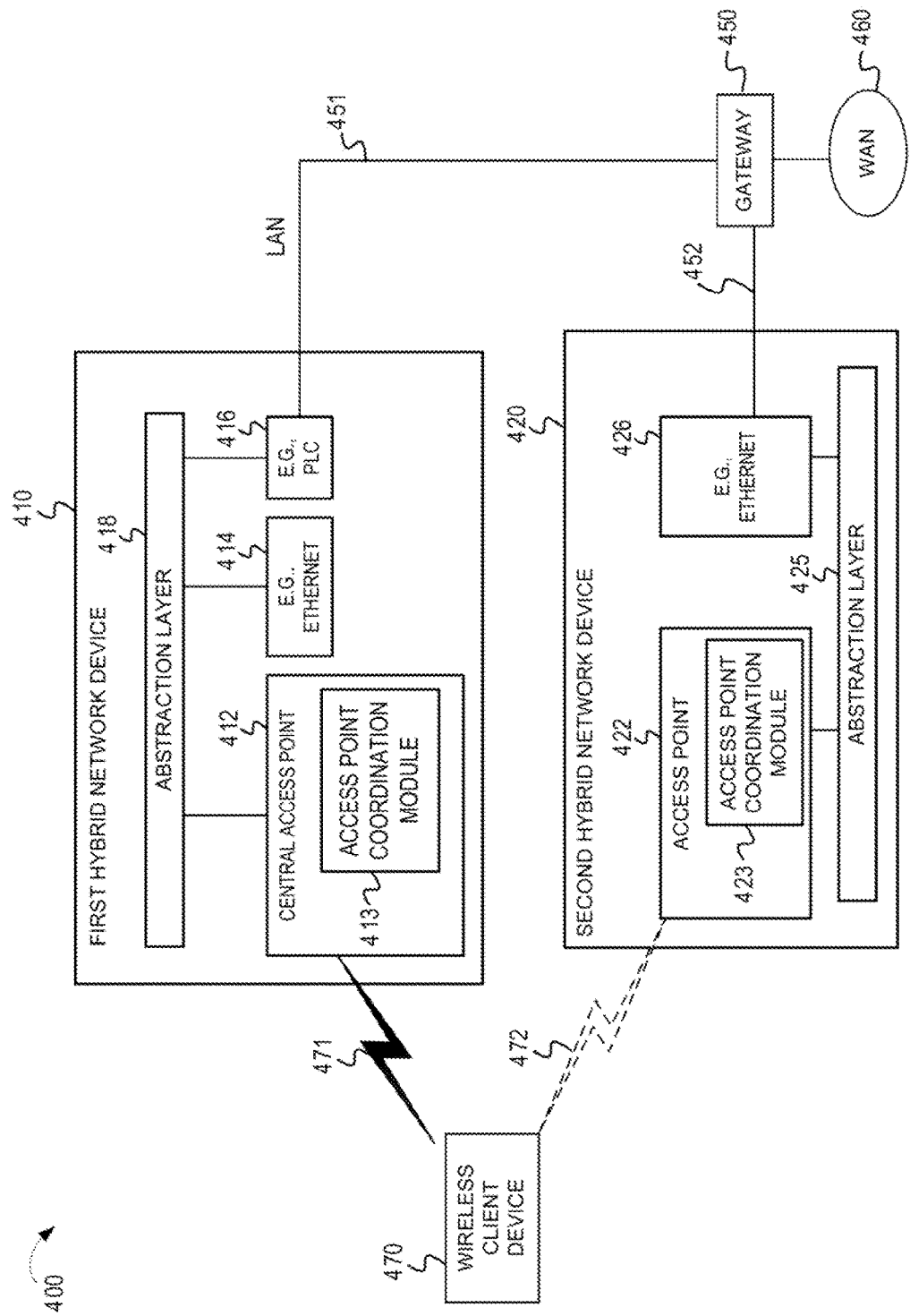
FIG. 4 depicts an example system diagram to cause a wireless client device to re-associate from a first AP to a second AP of a hybrid network based on backhaul conditions.

FIG. 4 depicts an example system diagram to re-associate a wireless client device from a first AP to a second AP of a hybrid network based on backhaul conditions. FIG. 4 includes a hybrid network 400 having a first hybrid network device 410, a second hybrid network device 420, and a wireless client device 470. The first hybrid network device 410 may include an abstraction layer 418 associated with multiple types of network interfaces including a WLAN interface via a central AP 412, a powerline interface 416, and an Ethernet interface 414. It should be understood that while interface 416 is depicted as a powerline communications interface as an example, other technologies could be used. The present disclosure is not limited to a particular backhaul technology. Examples of backhaul technologies might include, without limitation, a powerline communications network (as shown in FIG. 4), a multimedia over coax (MoCA, not shown), another wireless link (not shown), or any other technology to communicatively couple the first hybrid network device 410 to a gateway 450.

In the example depicted in FIG. 4, the powerline interface 416 may communicatively couple the first hybrid network device 410 via a powerline network 451 to the gateway 450. The powerline interface 416 and the Ethernet interface 414 may provide separate backhaul links to the gateway 450. In the example of FIG. 4, the central AP 412 may provide centralized coordination for one or more other APs in the hybrid network.

The second hybrid network device 420 may include an abstraction layer 425 associated with multiple types of network interfaces including a WLAN interface via an AP 422, and an Ethernet interface 426 (as a non-limiting example). The Ethernet interface 426 may communicatively couple the second hybrid network device 420 to a LAN 452. The central AP 412 and the AP 422 can provide wireless connectivity to the wireless client device 470 in the hybrid network 400. The central AP 412 and the AP 422 include AP coordination modules 413 and 423 respectively which may coordinate to re-associate the wireless client device 470 from the central AP 412 to the AP 422. The wireless client device 470 may initially be associated with the central AP 412 via a wireless link 471. FIG. 4 also depicts a subsequent wireless link 472 between the wireless client device 470 and the AP 422 that may result after the re-association of the wireless client device 470 from the central AP 412 to the AP 422.

In some implementations, the hybrid network devices 410, 420 may be communicatively coupled to the gateway 450 via multiple backhaul links. For example, the first hybrid network device 410 may be communicatively coupled to the gateway 450 via a backhaul link (e.g., powerline network 451) using the powerline interface 416. The first hybrid network device 410 may also be communicatively coupled to the gateway 450 using the Ethernet interface 414 via a LAN (not shown). Similarly, the second hybrid network device 420 is communicatively coupled to the gateway 450 via a LAN 452 using the Ethernet interface 426. Based on the channel characteristics (e.g., noise, contention on the channel), different backhaul links may offer different data rates to the hybrid network devices 410 and 420. For example, powerline communication medium is susceptible to noise from neighboring electrical devices. The backhaul link using the powerline interface 416 may offer lower data rates to the first hybrid network device 410 as compared to the backhaul link using the Ethernet interface 426. The AP coordination module 413 may compare available data rates on the backhaul links of the hybrid network devices 410 and 420 to determine whether to re-associate the wireless client device 470 from the central AP 412 to the AP 422.

For example, the AP coordination module 413 may determine that the central AP 412 using the backhaul link via the powerline interface 416 offers a first throughput (e.g., 6 Mbps) to the wireless client device 470, while the AP 422 offers a second throughput (e.g., 54 Mbps) to the wireless client device 470 using the backhaul link via the Ethernet interface 426. The AP coordination module 413 can determine to re-associate the wireless client device 470 from the central AP 412 to the AP 422 so that the wireless client device 470 may benefit from the second throughput that is higher than the first throughput.

In another example, the central AP 412 and the AP 422 may offer roughly the same or similar throughput but may have different network paths or network latency. For example, the AP coordination module 413 may determine to re-associate the wireless client device 470 from the central AP 412 to the AP 422 based on reducing the number of hops in path from each of the APs 412, 422 to a destination (e.g., WAN 460). In another example, the AP coordination module 413 may determine that the powerline interface 416 is more susceptible to noise due to electrical devices neighboring the first hybrid network device 410 which may result in greater bit error rates to the wireless client device when the wireless client device 470 uses the central AP 412. Based on types of backhaul networks or conditions, the AP coordination module 413 may determine to re-associate the wireless client device 470 from the central AP 412 to the AP 422.

FIG. 4 depicts the first hybrid network device 410 including the central AP 412. It is noted that the central AP 412 may coordinate operations for re-association of wireless client devices between one or more APs in the hybrid network 400. For example, the AP coordination module 413 in the central AP 412 may maintain information about the alternate APs detected by the wireless client device 470. The AP coordination module 413 may send the information about alternate APs detected by the wireless client device 470 to AP coordination modules of one or more APs requesting the information. It is further noted that the central AP 412 may store the information about re-association activity of the wireless client devices in the hybrid network 400. For example, the central AP 412 may store the operations performed by the central AP 412 (e.g., a temporary decrease in transmit power of beacon frames by the central AP 412, etc.) and the AP 422 (e.g., a temporary increase in transmit power of beacon frames by the AP 422) during the re-association of the wireless client device 470 from the central AP 412 to the AP 422. The central AP 412 may send the information about re-association activity of a wireless client device when requested by one or more APs in the hybrid network 400.

Figure 5:
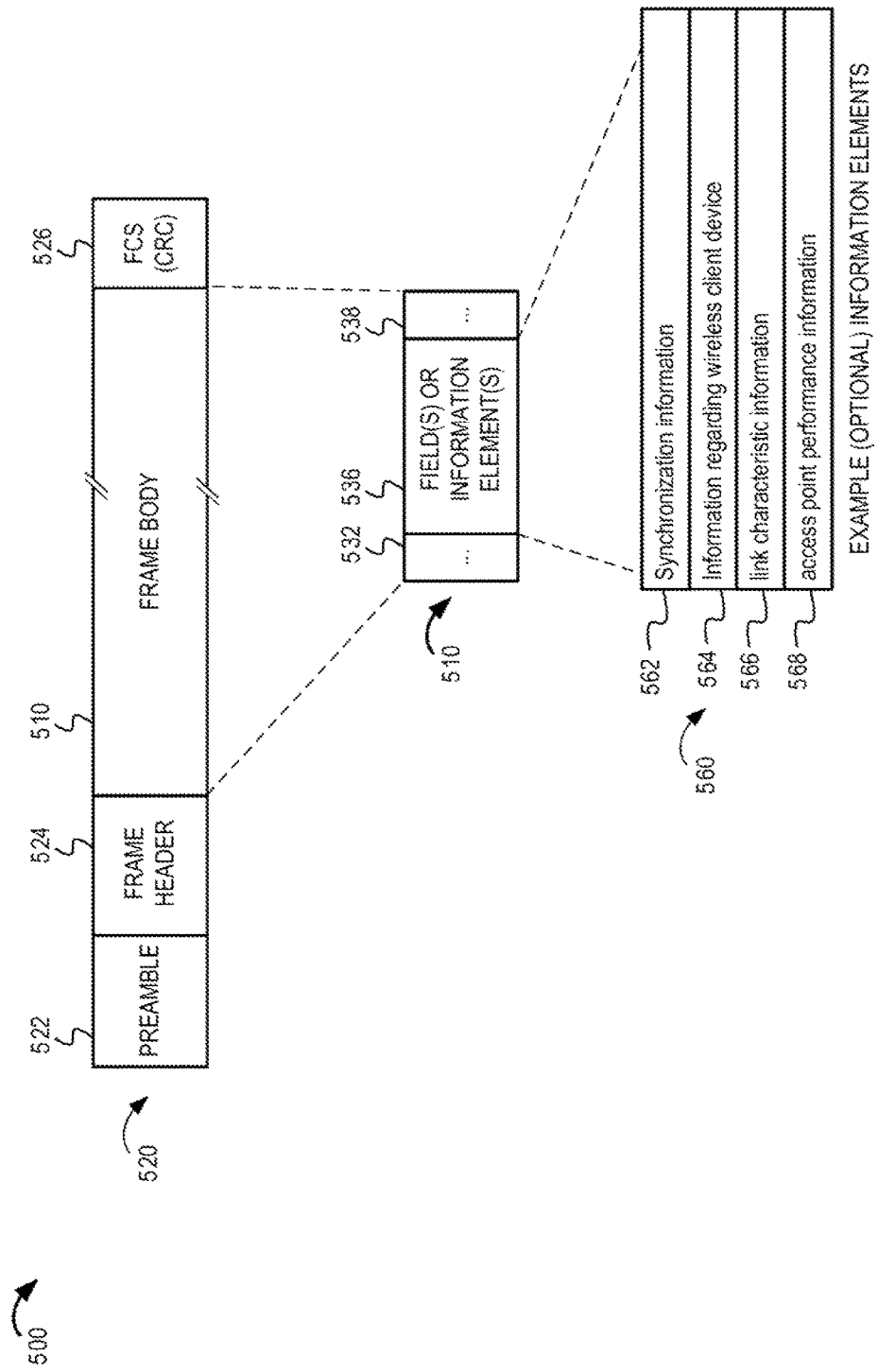
FIG. 5 depicts an example conceptual diagram of an AP coordination message sent from a first AP to a second AP of a wireless network.

FIG. 5 depicts an example conceptual diagram of an AP coordination message 500 that may be sent from a first AP to a second AP of a wireless network. FIG. 5 includes an example data frame 520. The data frame 520 may include a preamble 522, a frame header 524, a frame body 510, and a frame check sequence (FCS) 526. The preamble 522 may include one or more bits to establish synchronization at the second AP (e.g., the second AP 320 as described above with reference to FIG. 3). The frame header 524 may include source and destination network addresses (e.g., the network address of the APs 310, 320, respectively), the length of data frame, or other frame control information. The frame body 510 may be organized with a message format and may include a variety of fields or information elements 532, 536, and 538.

Various fields or information elements may include coordination information to coordinate the re-association from the first AP to the second AP. Several examples of coordination information elements 560 are illustrated in FIG. 5. For example, the coordination information elements may include synchronization information 562, information regarding wireless client device 564, link characteristic information 566, or AP performance information 568. In one implementation, the synchronization information 562 may include a time period within which the wireless client device is scheduled to disassociate from the first AP or a time period within which the wireless client device is expected to associate with the second AP. In one implementation, the synchronization information 562 may indicate a time period during which the first AP will perform re-association activities (such as temporarily decreasing transmit power of beacon frames transmitted by the first AP).

The information regarding wireless client device 564 may include a device identifier (e.g., network address, media access control (MAC) address, etc.) of the wireless client device. The link characteristic information 566 may include information about the existing wireless link between the wireless client device and the first AP, throughput offered by the first AP to the wireless client device, or other link characteristic information. The AP performance information 568 may include one or more performance parameters of the first AP. For example, the performance parameters may include a number of wireless client devices that can be simultaneously supported by the first AP, a number of wireless client devices currently associated with the first AP, the channels utilized by the first AP for communication over the wireless medium, or other parameters.

Although, not depicted in FIG. 5, the information elements 536 may also include one or more instructions from the first AP to the second AP to coordinate the re-association of the wireless client device. For example, the instructions may include an instruction to temporarily (e.g., for a predefined time interval) increase the transmit power of beacon frames transmitted by the second AP. In some implementations, the instructions may also include an instruction to accept the association request from the wireless client device, etc.

Figure 6:
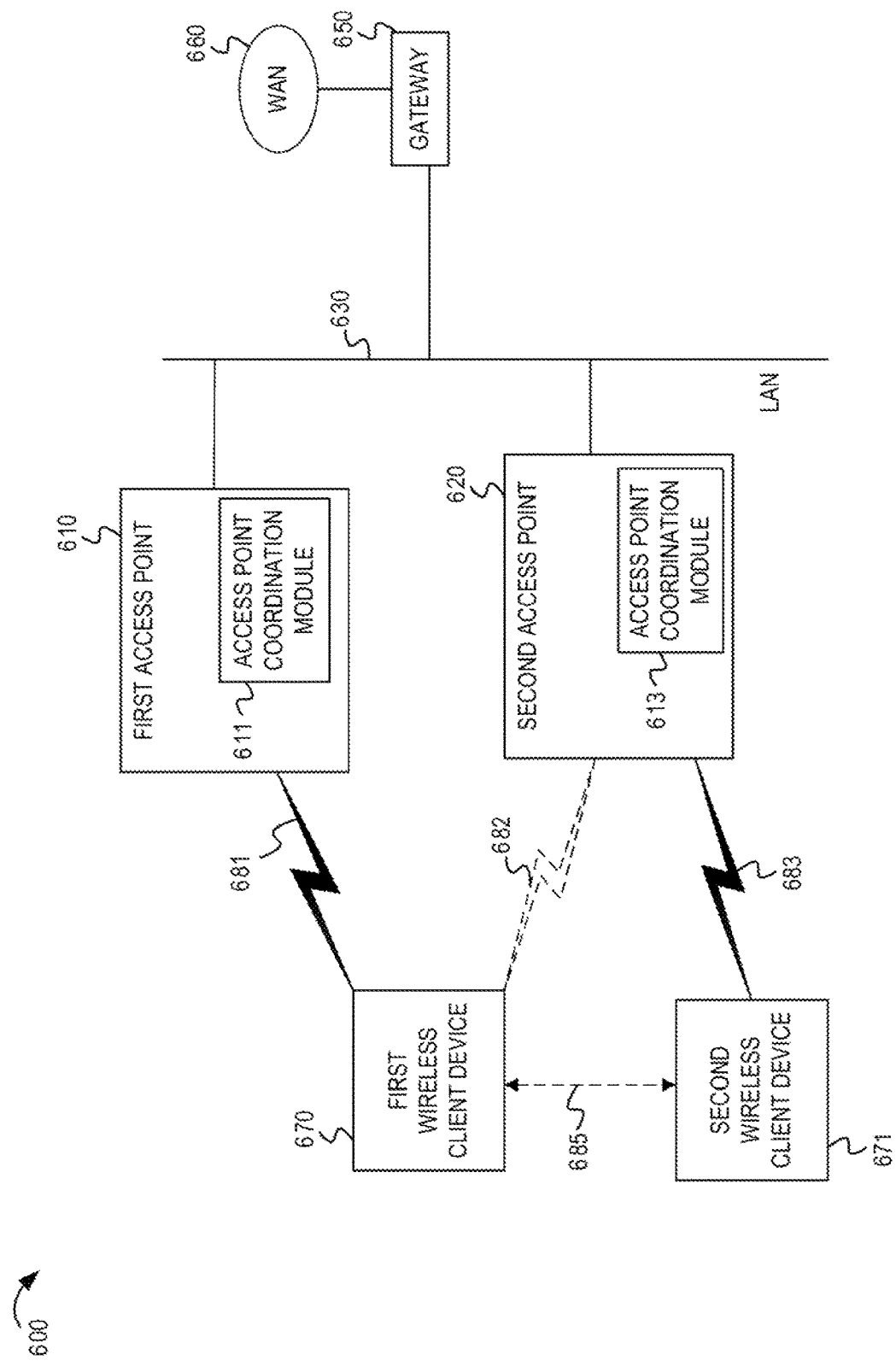
FIG. 6 depicts an example conceptual diagram of a re-association of a first wireless client device from a first AP to a second AP based on detecting network traffic flow between the first wireless client device and a second wireless client device associated with the second AP.

FIG. 6 depicts an example conceptual diagram of a re-association of a first wireless client device 670 from a first AP 610 to a second AP 620 based on detecting network traffic flow between the first wireless client device 670 and a second wireless client device 671 associated with the second AP 620. FIG. 6 includes a wireless network 600, similar to the wireless network 100 (as described above with reference to FIG. 1). The wireless network 600 may be served by a backhaul LAN 630. The LAN 630 may be interfaced to a WAN 660 via a gateway 650. The first AP 610 may have a first AP coordination module 611 and the second AP 620 may have a second AP coordination module 613. The APs 610, 620 may be similar to the APs described in previous Figures. Similarly, the wireless client devices 670, 671 may be similar to the wireless client devices described in previous Figures.

Initially, the first wireless client device 670 is associated with the first AP 610 via a first wireless link 681 and the second wireless client device 671 is associated with the second AP 620 via a second wireless link 683. Upon completion of the re-association, the first wireless client device 670 and the second AP 620 may establish a new wireless link 682 to replace the first wireless link 681.

In one implementation, based, at least in part, on network traffic flow between the first wireless client device 670 and the second wireless client device 671, the first AP 610 may determine to cause the wireless client device 670 to re-associate from the first AP 610 to the second AP 620. For example, the first AP coordination module 611 may detect the network traffic flow between the first wireless client device 670 and the second wireless client device 671. In some implementations, the first AP coordination module 611 may detect the network traffic flow between the first wireless client device 670 and the second wireless client device 671 based on detecting network traffic flow between the first AP 610 and the second AP 620 over the backhaul LAN 630.

In some embodiments, the first AP coordination module 611 may determine to cause the re-association for the first wireless client device 670 so that both the first and second wireless client devices 670, 671 can communicate with each other without the use of backhaul LAN 630 resources. For example, the second AP 620 may bridge traffic from the new wireless link 682 to the second wireless link 683. Alternatively, the first AP coordination module 611 may determine whether the first wireless client device 670 and the second wireless client device 671 can support direct peer-to-peer communication (e.g., via a tunneled direct link setup (TDLS)) if both wireless client devices 670, 671 were associated with the same AP (e.g., second AP 620).

The first AP coordination module 611 may also determine whether the first wireless client device 670 can be associated with the second AP 620 (e.g., the received signal strength of beacon frames from the second AP 620 is above a predefined threshold). On determining that the first wireless client device 670 and the second wireless client device 671 can support peer-to-peer communication, the first AP coordination module 611 may determine if a greater throughput can be achieved via a peer-to-peer link between the first wireless client device 670 and the second wireless client device 671 as compared to the throughput via the first AP 610. In some implementations, the first AP coordination module 611 may also determine that the peer-to-peer link between the first wireless client device 670 and the second wireless client device 671 would result in lower utilization of network resources. For example, once the peer-to-peer link is set up, the network traffic between the first wireless client device 670 and the second wireless client device 671 may not have to traverse through the first AP 610 via the LAN 630 to the second AP 620.

If the first AP coordination module 611 determines that causing the first wireless client device 670 to re-associate from the first AP 610 to the second AP 620, the first AP coordination module 611 may coordinate with the second AP coordination module 613 to cause the re-association of the first wireless client device 670 from the first AP 610 to the second AP 620.

Figure 7:
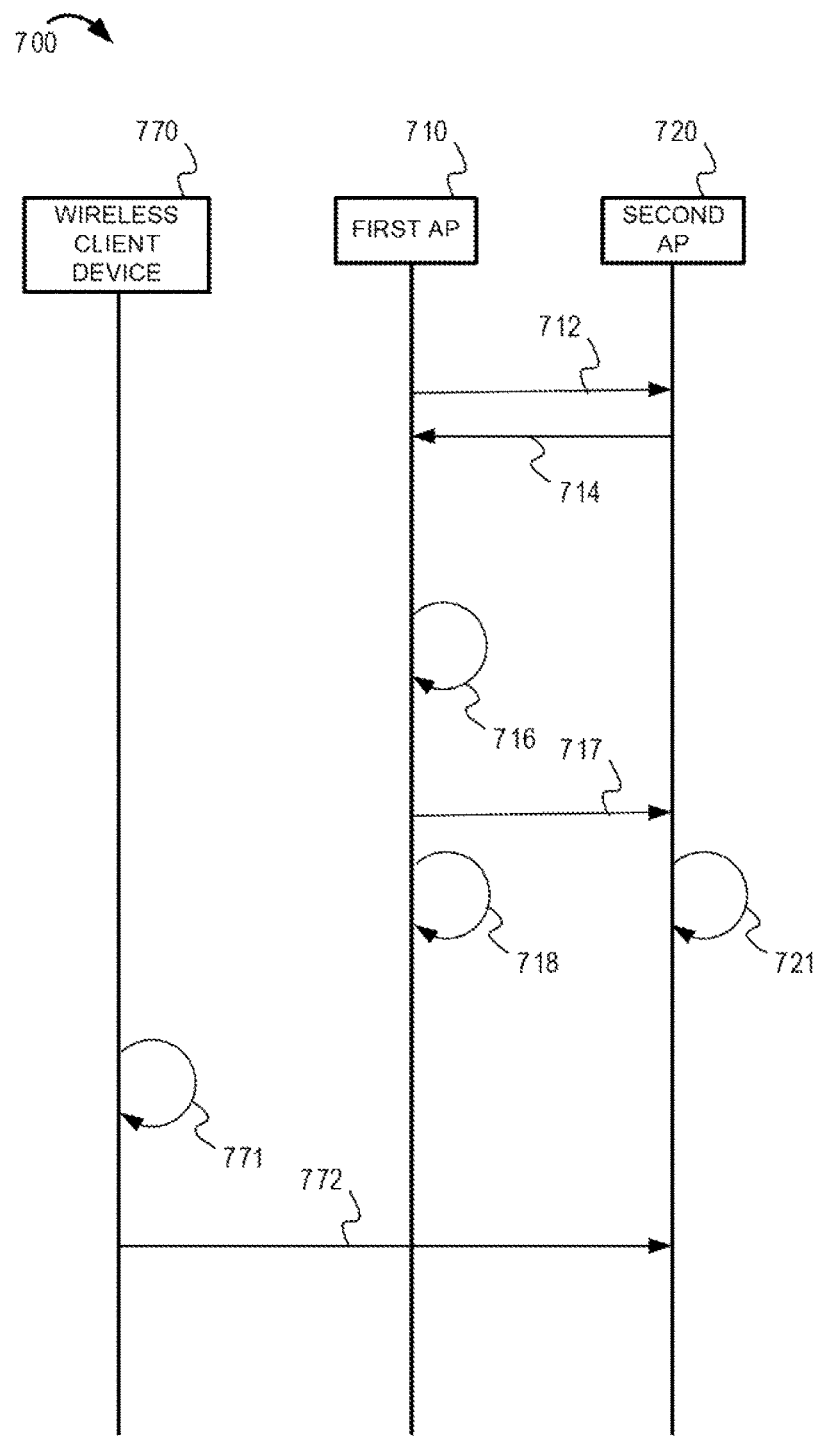
FIG. 7 depicts an example sequence diagram of message exchanges between a wireless client device, a first AP, and a second AP to cause the wireless client device to re-associate from the first AP to the second AP in a wireless network.

FIG. 7 depicts an example sequence diagram 700 of message exchanges between a wireless client device 770, a first AP 710, and a second AP 720 to re-associate the wireless client device 770 from the first AP 710 to the second AP 720 in a wireless network. In one implementation, the wireless client device 770 is initially associated with the first AP 710. The first AP 710 may send a message (shown as arrow 712) to request a throughput capability of the second AP 720. The second AP 720 may send a response (shown as arrow 714) to the first AP 710 including the throughput capability which the second AP 720 may be able to provide to the wireless client device 770. In some implementations, the first AP 710 may request other performance characteristics (not shown, e.g., latency, contention at the second AP 720, etc.) from the second AP 720.

At 716, based at least in part on the response 714 from the second AP 720, the first AP 710 may determine whether to re-associate the wireless client device 770 to the second AP 720. At 717, the first AP 710 may send an AP coordination message (as described previously, such as FIG. 5) to the second AP 720. For example, the AP coordination message may indicate timing of re-association activities, or an indication of which re-association activities the first AP 710 will perform. At 718, the first AP 710 may perform the re-association activities. The re-association activities may include, for example, reducing the transmit power of beacon frames transmitted from the first AP 710 for a predefined time interval, as well as forcing a disassociation of the wireless client device 770 from the first AP 710. Concurrently, the second AP 720 may perform one or more operations at 721 to coordinate the re-association of the wireless client device 770. For example, the second AP 720 may increase the transmit power of beacon frames transmitted from the second AP 720 for the predefined time interval indicated in the AP coordination message. At 771, the wireless client device 770 may detect that the signal strength of the beacon frames transmitted from the first AP 710 is lower than the signal strength of the beacon frames transmitted from the second AP 720. At 772, the wireless client device 770 may send an association request to the second AP 720.

Figure 8:
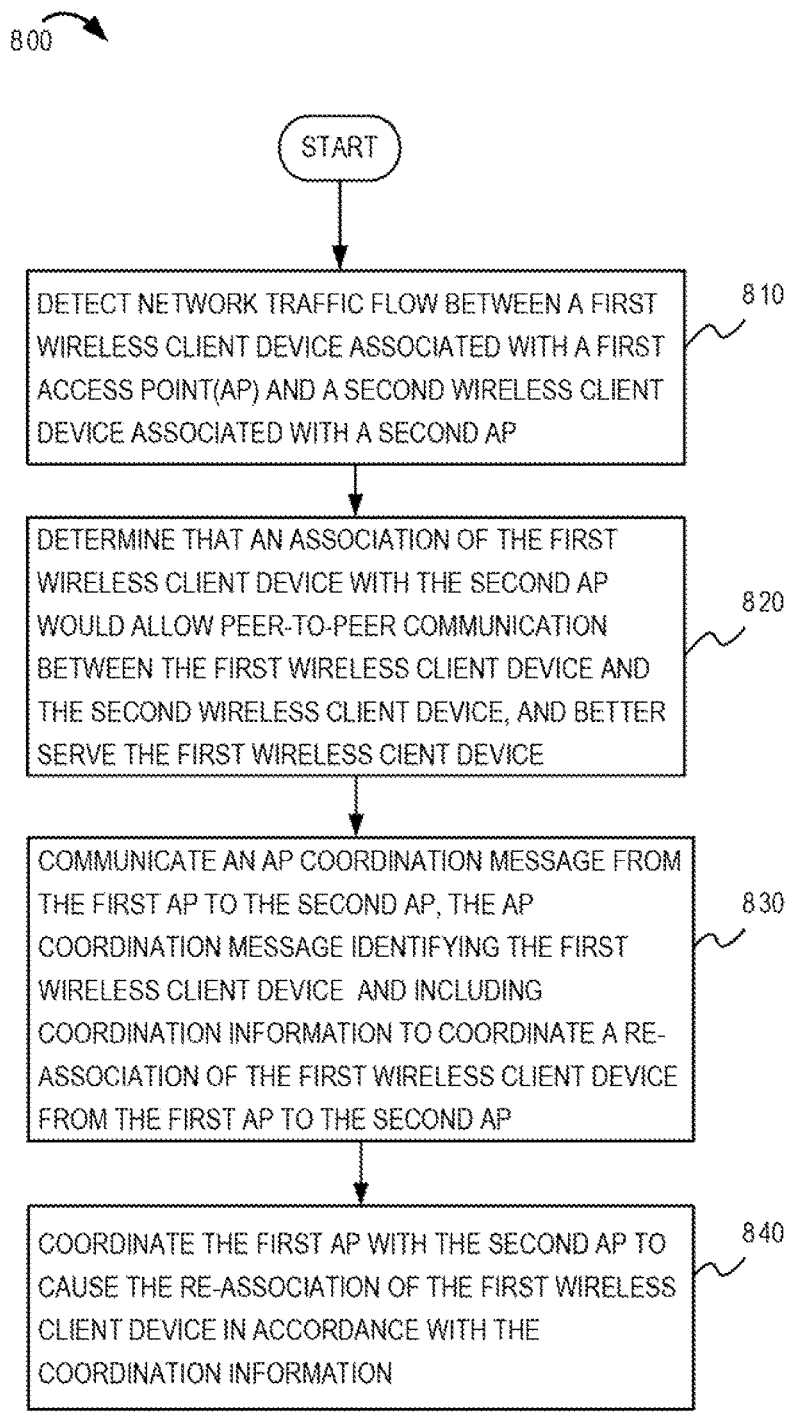
FIG. 8 illustrates a flow diagram of example operations to cause a first wireless client device to re-associate from a first AP to a second AP based on detecting network traffic between the first wireless client device and a second wireless client device associated with the second AP.

FIG. 8 illustrates a flow diagram 800 of example operations to re-associate a first wireless client device from a first AP to a second AP based on detecting network traffic between the first wireless client device and a second wireless client device associated with the second AP.

At block 810, a network traffic flow between a first wireless client device associated with a first AP and a second wireless client device associated with a second AP is detected. In one implementation, an AP coordination module detects the network traffic flow between the first wireless client device and the second wireless client device. For example, the AP coordination module may detect the network flow between the first wireless client device and the second wireless client device based on detecting a flow of traffic on the backhaul LAN between the first AP and the second AP, or based on source and destination network addresses. The AP coordination module may also collect information about which wireless client devices are associated with various APs so that when peer traffic is detected, the AP coordination module can consider a re-association of one or more of the peer devices.

At block 820, it is determined that an association of the first wireless client device with the second AP would allow more efficient peer-to-peer communication between the first wireless client device and the second wireless client device. In one implementation, the AP coordination module determines that the association of the first wireless client device with the second AP would allow peer-to-peer communication between the first wireless client device and the second wireless client device that is already associated with the second AP.

At block 830, an AP coordination message is communicated from the first AP to the second AP. The AP coordination message can identify the first wireless client device and include coordination information to coordinate a re-association of the first wireless client device from the first AP to the second AP. The AP coordination information in the AP coordination message may include a device identifier of the first wireless client device that is to be re-associated to the second AP. AP coordination information may also describe timing information regarding a selected re-association technique being used to cause the first wireless client device to re-associate to the second AP.

At block 840, the first AP coordinates with the second AP to cause the re-association of the first wireless client device in accordance with the coordination information as described previously.

Figure 9:
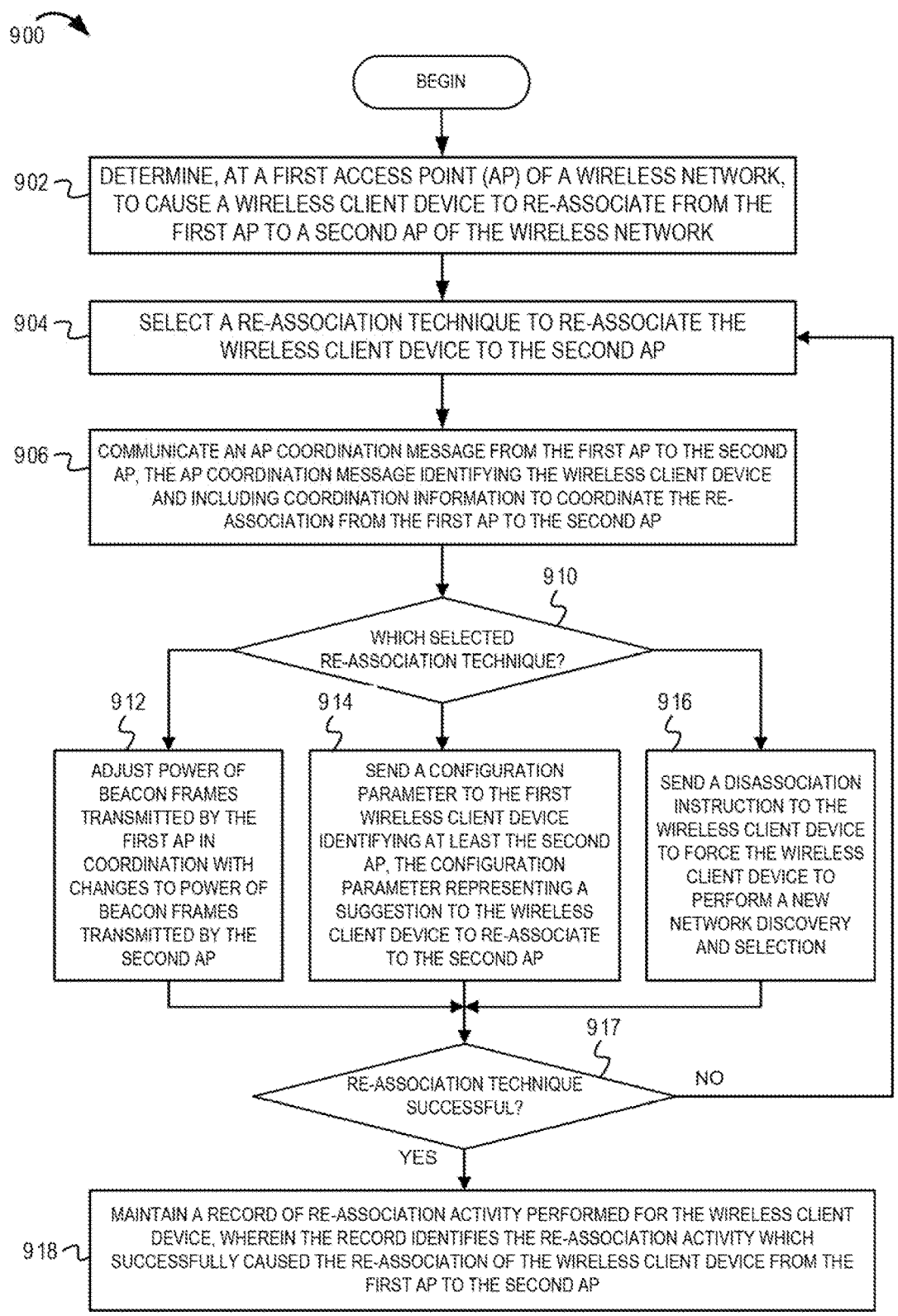
FIG. 9 illustrates a flow diagram of example operations to cause a first wireless client device to re-associate from a first AP to a second AP by utilizing one of a plurality of techniques stored in a network memory of a wireless network.

FIG. 9 illustrates a flow diagram 900 of example operations to re-associate a first wireless client device from a first AP to a second AP by utilizing one of a plurality of re-association techniques.

At block 902, a first AP of a wireless network determines to cause a wireless client device to re-associate to a second AP of the wireless network.

At block 904, a re-association technique is selected. As described previously, there may be several re-association techniques or activities that may result in re-associating the wireless client device from the first AP to the second AP. However, not all re-association techniques are supported for various wireless client devices. The APs may attempt different re-association techniques until identifying a re-association technique that successfully results in the re-association. The first AP may select a re-association technique to re-associate the wireless client device based on previous attempts of a particular re-association technique that caused a successful re-association of the wireless client device.

At block 906, an AP coordination message is communicated from the first AP to the second AP. The AP coordination message may identify the wireless client device and include coordination information to coordinate the re-association of the wireless client device from the first AP to the second AP. The AP coordination information in the AP coordination message may include a device identifier of the wireless client device. The AP coordination information may also identify the selected re-association technique and timing associated with performing re-association activities for the selected re-association technique.

At decision 910, the flow diagram branches to a selected one of plurality of possible re-association activities described in relation to blocks 912, 914, and 916. Blocks 912, 914, and 916 each represent different re-association techniques from among a plurality of possible re-association techniques. It should be noted that the re-association techniques described herein are examples and other re-association techniques may be included in the plurality of re-association techniques from which the first AP selects.

At alternative block 912, power of beacon frames transmitted by the first AP is adjusted in coordination with changes to power of beacon frames transmitted by the second AP. In one implementation, the first AP and the second AP adjust the transmit power of beacon frames transmitted by the first AP and the second AP, respectively. For example, the first AP may reduce the transmit power of beacon frames transmitted from the first AP for a predefined time interval. The second AP may increase the power of the beacon frames transmitted from the second AP for a predefined interval. The wireless client device may be forced to disassociate from the first AP responsive to a disassociation message from the first AP. Alternatively, the wireless client device may choose to disassociate based on the change in power level of the beacon frames transmitted by the first AP. The wireless client device may discover the second AP and determined that the received signal strength of the beacon frames received from the second AP is stronger than the received signal strength of the beacon frames received from the first AP. As a result of the relative signal strengths, the wireless client device may choose to associate with the second AP.

At alternative block 914, a configuration parameter is sent to the first wireless client device identifying at least the second AP, the configuration parameter representing a suggestion to the wireless client device to reselect and associated with the second AP. For example, the configuration parameter may include a device identifier (e.g., MAC address, service set identifier (SSID), or other identifier) of the second AP. Alternatively, the configuration parameter may include an explicit instruction for the wireless client device to associate with the second AP if the wireless client device is capable of interpreting the explicit instruction. In some implementations, the first AP may send device identifiers of a plurality of APs in the configuration parameter and indicate to the wireless client device to associate with an AP from the plurality of APs based on RSSI of beacon frames from the plurality of APs.

At alternative block 916, a disassociation instruction is sent to the wireless client device to force the wireless client device to perform a new network discovery and selection. In one implementation, the first AP sends the disassociation instruction to the wireless client device. For example, the disassociation instruction may instruct the wireless client device to disassociate from the first AP within a predefined time interval. The disassociation instruction may also instruct the wireless client device to perform discovery of a new AP and not to associate with the first AP even if the first AP is discovered. In some implementations, the first AP may block further traffic from the wireless client device to prevent the wireless client device from associating with the first AP again.

From blocks 912, 914, 916, the flow diagram continues to decision 917. At 917, if the re-association technique 912, 914, or 916 was unsuccessful in causing the desired re-association, then the flow may return to block 904 to select a different re-association technique. If the re-association technique 912, 914, 916 was successful in causing the desired re-association, then the flow may continue to block 918.

At block 918, a record of re-association activity performed for the wireless client device is maintained. The record identifies the re-association activity or activities which successfully caused the re-association of the wireless client device from the first AP to the second AP. In one implementation, the first AP may receive a confirmation from the second AP that the wireless client device has successfully associated with the second AP. On receiving the confirmation, the first AP may store the record of re-association activity for the wireless client device. For example, the record of re-association activity may include a device identifier (e.g., MAC address) of the wireless client device and one of the re-association techniques (such as those described at blocks 912, 914, and 916) that was successfully used to re-associate the wireless client device from the first AP to the second AP. In some implementations, the record of re-association activity may also include device identifiers of the first and second APs (i.e., the first AP and the second AP). The record may also store the average latency or delay associated with the successful re-association technique.

If the wireless client device should later become re-associated with the first AP and the first AP determines to cause another re-association, the first AP may utilize the record of previous re-associations (see block 918) in the subsequent selection of re-association technique. Over several attempts and re-associations, the access points may become aware of the capabilities of particular wireless client devices. The capabilities and associated delay of different re-association techniques may be considered when selecting a re-association technique for a particular wireless client device.

It is noted that the operations described in flow diagrams of FIGS. 2, 8, and 9 are exemplary in nature. It is further noted that the flow diagrams of FIGS. 2, 8, and 9 do not depict all embodiments to re-associate a wireless client device from a first AP to a second AP. For example, the operations at block 840 may include one of the re-association techniques described at block 912, 914, 916 of FIG. 9.

It should be understood that FIGS. 1-10 and the operations described herein are examples meant to aid in understanding embodiments and should not be used to limit embodiments or limit scope of the claims. Embodiments may perform additional operations, fewer operations, operations in parallel or in a different order, and some operations differently.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
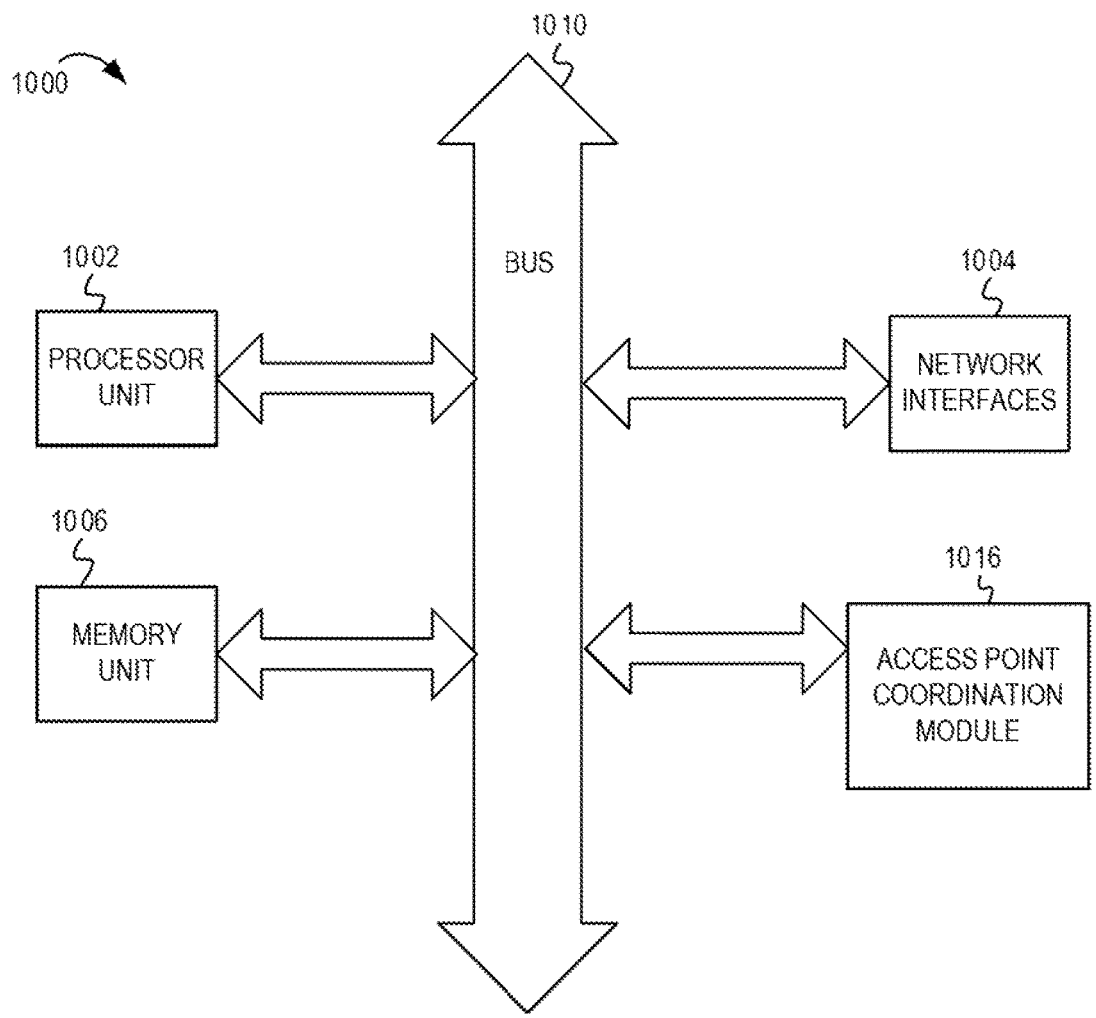
FIG. 10 is an example block diagram of one embodiment of an electronic device capable of implementing various embodiments in accordance with this disclosure.

FIG. 10 is an example block diagram of one embodiment of an electronic device 1000 capable of implementing various embodiments in accordance with this disclosure. The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1010 (e.g., PCI, ISA, PCI-Express, HyperTransport®, InfiniBand®, NuBus, AHB, AXI, etc.), and network interfaces 1004 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 1000 may include an AP coordination module 1016. The AP coordination module 1016 may be capable of performing various methods, techniques, operations, etc. described herein. For example, the AP coordination module 1016 may be suitable for coordinating with one or more APs in a wireless network to cause a wireless client device to re-associate to another AP in accordance with embodiments of this disclosure. Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the memory unit 1006, and the network interfaces 1004 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the present disclosure is not limited to them. In general, techniques for implementing a re-association of a wireless client device from a first AP to a second AP in a wireless network as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method performed by a first access point (AP) of a wireless network, the method comprising:
   determining to re-associate a wireless client device from the first AP to a second AP of the wireless network;

selecting a re-association technique to perform from a plurality of re-association techniques to cause the wireless client device to re-associate to the second AP, wherein the re-association technique is selected from a group consisting of:
  decreasing transmit power of beacon frames transmitted by the first AP;
  transmitting a configuration parameter to the wireless client device to cause the wireless client device to re-associate to the second AP;
  transmitting a disassociation instruction to the wireless client device to force the wireless client device to perform a new network discovery and selection; and
  blocking at least one incoming packet from the wireless client device to force the wireless client device to perform the new network discovery and selection;
communicating an AP coordination message to the second AP, the AP coordination message including an identification of the wireless client device and a field that indicates the re-association technique; and
coordinating the first AP with the second AP to re-associate the wireless client device to the second AP in accordance with the re-association technique.

2. The method of claim 1, wherein decreasing the transmit power of beacon frames transmitted by the first AP comprises coordinating a decrease of the transmit power of beacon frames transmitted by the first AP in coordination with an increase of transmit power of beacon frames transmitted by the second AP.

3. The method of claim 1, wherein the AP coordination message further includes timing information to synchronize performance of the re-association technique.

4. The method of claim 1, further comprising:
  maintaining a record of previous re-association techniques performed for the wireless client device, wherein the record identifies the wireless client device and indicates a previous re-association technique used to re-associate the wireless client device from the first AP to the second AP.

5. The method of claim 4, wherein the record further includes latency associated with an amount of time between a beginning of the previous re-association technique and a completion of the previous re-association technique.

6. The method of claim 1, wherein selecting the re-association technique comprises:
  selecting the re-association technique based, at least in part, on a record of a previous re-association technique.

7. The method of claim 1, wherein coordinating the first AP with the second AP comprises temporarily reducing transmit power of first beacon frames at the first AP.

8. The method of claim 7, wherein the AP coordination message includes an indicator to cause the second AP to increase transmit power of second beacon frames transmitted by the second AP.

9. The method of claim 1, wherein coordinating the first AP with the second AP comprises transmitting a disassociation instruction to the wireless client device.

10. The method of claim 9, further comprising:
  blocking, at the first AP, at least one incoming packet from the wireless client device.

11. The method of claim 1, wherein coordinating the first AP with the second AP comprises:
  transmitting a configuration parameter to the wireless client device to cause the wireless client device to re-associate with the second AP.

12. The method of claim 11, wherein the configuration parameter includes a list of candidate APs that includes at least the second AP.

13. The method of claim 1, wherein determining to re-associate comprises:
  determining a first performance characteristic related to wireless association between the wireless client device and the first AP;
  estimating a second performance characteristic related to a potential wireless association between the wireless client device and the second AP; and
  determining that the second performance characteristic is greater than the first performance characteristic.

14. The method of claim 13, wherein communicating the AP coordination message is in response to determining that the second performance characteristic is greater than the first performance characteristic.

15. The method of claim 1, wherein determining to re-associate comprises:
  determining that an association of the wireless client device with the second AP would provide greater application throughput to the wireless client device.

16. The method of claim 1, wherein determining to re-associate comprises:
  determining that an association of the wireless client device with the second AP would improve load balancing between the first AP and the second AP.

17. The method of claim 1, wherein determining to re-associate comprises:
  determining that an association of the wireless client device with the second AP would allow peer-to-peer communication between the wireless client device and other wireless client devices associated with the second AP.

18. The method of claim 17, wherein determining that the association of the wireless client device with the second AP would allow peer-to-peer communication comprises detecting a network traffic flow between the wireless client device and at least one wireless client device associated with the second AP.

19. The method of claim 1, wherein determining to re-associate comprises:
  determining to disassociate the wireless client device from the first AP based, at least in part, on information received from a member of a group consisting of the second AP, another AP, and a central coordinator of the wireless network.

20. The method of claim 1, further comprising:
  receiving a confirmation that the wireless client device has become associated with the second AP.

21. A first access point (AP) of a wireless network, the first AP comprising:
  a network interface operable to couple with the wireless network;
  a processor; and
  memory storing configured to store instructions which, when executed by the processor, cause the first AP to:
    determine to re-associate a wireless client device from the first AP to a second AP of the wireless network;
    select a re-association technique to perform from a plurality of re-association techniques to cause the wireless client device to re-associate to the second AP, wherein the re-association technique is selected from a group consisting of:
      decreasing transmit power of beacon frames transmitted by the first AP;

transmitting a configuration parameter to the wireless client device identifying at least the second AP to cause the wireless client device to re-associate to the second AP;

transmitting a disassociation instruction to the wireless client device to force the wireless client device to perform a new network discovery and selection; and blocking at least one incoming packet from the wireless client device to force the wireless client device to perform the new network discovery and selection;

communicate an AP coordination message to the second AP, the AP coordination message including an identification of the wireless client device and a field that indicates the re-association technique; and coordinate the first AP with the second AP to re-associate the wireless client device to the second AP in accordance with the re-association technique.

22. The first AP of claim 21, wherein the re-association technique of decreasing the transmit power of beacon frames transmitted by the first AP comprises coordinating a decrease of the transmit power of beacon frames transmitted by the first AP in coordination with an increase of transmit power of beacon frames transmitted by the second AP.

23. The first AP of claim 21, wherein the AP coordination message further includes timing information to synchronize performance of the re-association technique.

24. The first AP of claim 21, wherein the instructions which, when executed by the processor of the first AP, further cause the first AP to:

maintain a record of previous re-association techniques performed for the wireless client device, wherein the record identifies the wireless client device and indicates a previous re-association technique used to re-associate the wireless client device from the first AP to the second AP.

25. The first AP of claim 24, wherein the record further includes latency associated with an amount of time between a beginning of the previous re-association technique and a completion of the previous re-association technique.

26. The first AP of claim 21, wherein the instructions to select the re-association technique comprises instructions which, when executed by the processor of the first AP, cause the first AP to:

select the re-association technique based, at least in part, on a record of a previous re-association technique.

27. The first AP of claim 21, wherein the instructions to coordinate the first AP with the second AP comprises instructions which, when executed by the processor, cause the first AP to temporarily reduce transmit power of first beacon frames transmitted via the network interface at the first AP.

28. The first AP of claim 27, wherein the AP coordination message includes an indicator to cause the second AP to increase transmit power of second beacon frames transmitted by the second AP.

29. The first AP of claim 21, wherein the instructions to determine to re-associate comprises instructions which, when executed by the processor, cause the first AP to:

determine that an association of the wireless client device with the second AP would provide greater application throughput to the wireless client device.

30. The first AP of claim 21, wherein the instructions to determine to re-associate comprises instructions which, when executed by the processor, cause the first AP to:

determine that an association of the wireless client device with the second AP would improve load balancing between the first AP and the second AP.

31. The first AP of claim 21, wherein the instructions to determine to re-associate comprises instructions which, when executed by the processor, cause the first AP to:

determine that an association of the wireless client device with the second AP would allow peer-to-peer communication between the wireless client device and other wireless client devices associated with the second AP.

32. The first AP of claim 31, wherein the instructions to determine that the association of the wireless client device with the second AP would allow peer-to-peer communication comprises instructions which, when executed by the processor, cause the first AP to:

detect a network traffic flow between the wireless client device and at least one wireless client device associated with the second AP.

33. A non-transitory computer readable medium storing instructions which, when executed by a processor of a first access point (AP) of a wireless network, cause the first AP to:

determine to re-associate a wireless client device from the first AP to a second AP of the wireless network;

select a re-association technique to perform from a plurality of re-association techniques to cause the wireless client device to re-associate to the second AP, wherein the re-association technique is selected from a group consisting of:

decreasing transmit power of beacon frames transmitted by the first AP;

transmitting a configuration parameter to the wireless client device identifying at least the second AP to cause the wireless client device to re-associate to the second AP;

transmitting a disassociation instruction to the wireless client device to force the wireless client device to perform a new network discovery and selection; and blocking at least one incoming packet from the wireless client device to force the wireless client device to perform the new network discovery and selection;

communicate an AP coordination message to the second AP, the AP coordination message including an identification of the wireless client device and including a field that indicates the re-association technique; and coordinate the first AP with the second AP to re-associate the wireless client device to the second AP in accordance with the re-association technique.

34. The non-transitory computer readable medium of claim 33, wherein the decreasing the transmit power of beacon frames transmitted by the first AP comprises coordinating a decrease of the transmit power of beacon frames transmitted by the first AP in coordination with an increase of transmit power of beacon frames transmitted by the second AP.

35. The non-transitory computer readable medium of claim 33, wherein the AP coordination message further includes timing information to synchronize performance of the re-association technique.

36. The non-transitory computer readable medium of claim 33, wherein the instructions, when executed by the processor of the first AP, cause the first AP to:

maintain a record of previous re-association techniques performed for the wireless client device, wherein the record identifies the wireless client device and indicates a previous re-association technique used to re-associate the wireless client device from the first AP to the second AP.

37. The non-transitory computer readable medium of claim 36, wherein the record further includes latency associated with an amount of time between a beginning of the previous re-association technique and a completion of the previous re-association technique.

38. The non-transitory computer readable medium of claim 33, wherein the instructions that cause the first AP to select the re-association technique comprises instructions which, when executed by the processor of the first AP, cause the first AP to:
 select the re-association technique based, at least in part, on a record of a previous re-association technique.

39. The non-transitory computer readable medium of claim 33, wherein the instructions that cause the first AP to coordinate the first AP with the second AP comprises instructions, when executed by the processor of the first AP, cause the first AP to temporarily reduce transmit power of first beacon frames transmitted via a network interface at the first AP.

40. The non-transitory computer readable medium of claim 39, wherein the AP coordination message includes an indicator to cause the second AP to increase transmit power of second beacon frames transmitted by the second AP.

41. The non-transitory computer readable medium of claim 33, wherein the instructions that cause the first AP to determine to re-associate comprises instructions, when executed by the processor of the first AP, cause the first AP to:
 determine that an association of the wireless client device with the second AP would provide greater application throughput to the wireless client device.

42. The non-transitory computer readable medium of claim 33, wherein the instructions that cause the first AP to determine to re-associate comprises instructions, when executed by the processor of the first AP, cause the first AP to:
 determine that an association of the wireless client device with the second AP would improve load balancing between the first AP and the second AP.

43. The non-transitory computer readable medium of claim 33, wherein the instructions that cause the first AP to determine to re-associate comprises instructions, when executed by the processor of the first AP, cause the first AP to:
 determine that an association of the wireless client device with the second AP would allow peer-to-peer communication between the wireless client device and other wireless client devices associated with the second AP.

44. An apparatus comprising:
 means for determining, at a first access point (AP) of a wireless network, to re-associate a wireless client device from the first AP to a second AP of the wireless network;
 means for selecting a re-association technique to perform from a plurality of re-association techniques to cause the wireless client device to re-associate to the second AP, wherein the re-association technique is selected from a group consisting of:
  decreasing transmit power of beacon frames transmitted by the first AP;
  transmitting a configuration parameter to the wireless client device identifying at least the second AP to cause the wireless client device to re-associate to the second AP;
  transmitting a disassociation instruction to the wireless client device to force the wireless client device to perform a new network discovery and selection; and
  blocking at least one incoming packet from the wireless client device to force the wireless client device to perform the new network discovery and selection;
 means for communicating an AP coordination message to the second AP, the AP coordination message including an identification of the wireless client device and a field that indicates the re-association technique; and
 means for coordinating the first AP with the second AP to re-associate the wireless client device to the second AP in accordance with the re-association technique.

* * * * *